United States Patent
Hosokawa et al.

[15] 3,638,091
[45] Jan. 25, 1972

[54] ELECTRIC POWER CONTROLLING APPARATUS

[72] Inventors: Tomoyuki Hosokawa, Takarazuka-shi; Chuzo Wada, Osaka; Hiroshi Horii, Takatsuki-shi, all of Japan

[73] Assignee: Matsushita Electric Industrial Co., Ltd., Osaka, Japan

[22] Filed: Nov. 24, 1969

[21] Appl. No.: 879,188

[30] Foreign Application Priority Data

Nov. 25, 1968 Japan............................43/85605

[52] U.S. Cl............................................318/484
[51] Int. Cl.............................................H02p 5/16
[58] Field of Search............318/305, 341, 345, 331, 484, 318/487

[56] References Cited

UNITED STATES PATENTS

| | | | |
|---|---|---|---|
| 3,407,345 | 10/1968 | Fruehauf | 318/341 |
| 3,422,330 | 1/1969 | Swanke | 318/305 |
| 3,165,688 | 1/1965 | Gutzwiller | 318/345 |
| 3,515,960 | 6/1970 | Buhr | 318/487 |

Primary Examiner—Bernard A. Gilheany
Assistant Examiner—Thomas Langer
Attorney—Stevens, Davis, Miller and Mosher

[57] ABSTRACT

An electric power controlling apparatus, wherein the time for which electric power is supplied to a load is determined in accordance with a change of the charging or discharging time of a capacitor, the amount of power to be supplied to said load is determined in accordance with a change of the trigger phase of a thyristor, and said changes are achieved by selecting variable elements by the use of pushbutton switches.

6 Claims, 11 Drawing Figures

T. HOSOKAWA,
C. WADA AND
H. HORII
INVENTORS

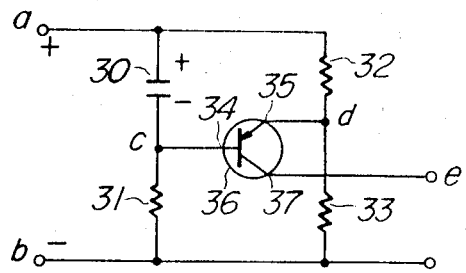
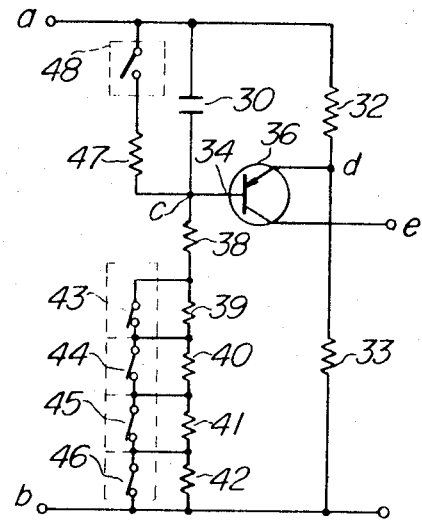
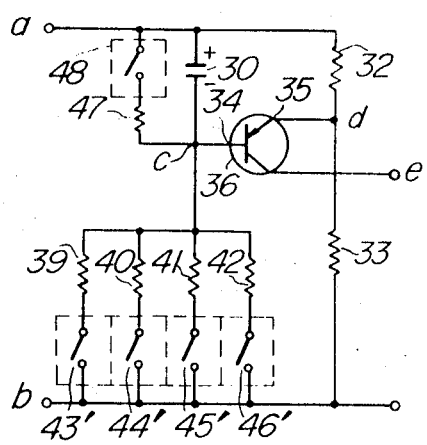
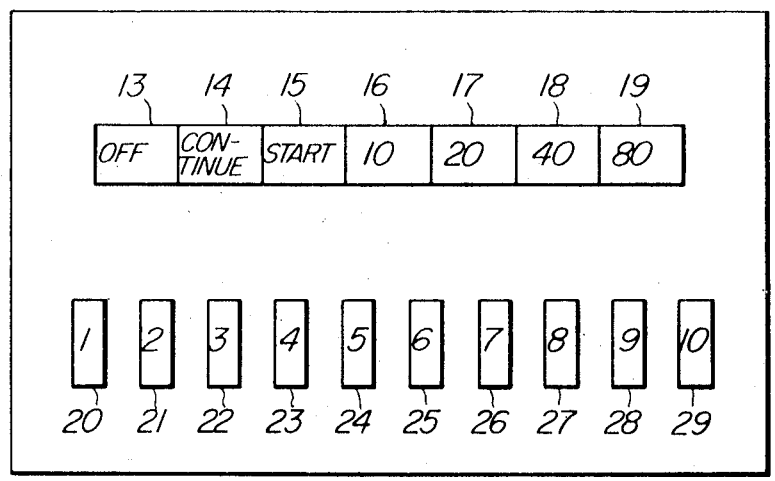

ELECTRIC POWER CONTROLLING APPARATUS

This invention relates to improvements in or relating to an electric power controlling apparatus wherein a predetermined amount of power is continuously or intermittently supplied to a load for a predetermined period of time.

There have conventionally been proposed electric power-controlling apparatus wherein application of electric power to a load is controlled by adjusting the trigger phase of a thyristor and the release of the power application is effected by means of a time-limit device. In such conventional apparatus, however, the power control is effected by turning a pointer (over a graduated dial), and the time-limit device uses a spring or a motor.

However, the amount of power and power supplying time should be set every time the apparatus is used, and it is often the case that different values should be set each time the apparatus is used. Furthermore, the apparatus should be newly set even when the same set values are repeatedly used. Therefore, the aforementioned conventional apparatus is disadvantageous in that great inconvenience is involved in using the same and it is impossible to achieve a high accuracy.

Referring to FIGS. 1 and 2, there is shown such a conventional apparatus, wherein a closed circuit is constituted by an AC power source 120, spring-type timer 121, load 122 and power control apparatus 123. The operating panel of the timer 121 is as shown in FIG. 2, wherein in order to set up a time limit, a pointer 124 is turned into registry with the corresponding one of the numerals indicated on a dial plate 125. Fine graduation is provided on the dial plate 125 in addition to the numerals. In the case where a time limit with a high accuracy is required to be set up, it is necessary to precisely set the thumb to the graduation. Although in the foregoing, description has been made of the case where the spring-type timer 121 is used, the above is also true in the case where a motor is used instead of the spring. In either case, it is required that the pointer 124 be turned to set up a desired time limit every time the apparatus is used. In an attempt to use such a conventional apparatus repeatedly, great inconvenience is involved in handling the same, and still it is impossible to obtain high accuracy.

The present invention is characterized in that the time for which electric power is supplied to a load is determined in accordance with a change of the charging or discharging time of a capacitor, the amount of power to be supplied to said load is determined in accordance with a change of the trigger phase of a thyristor and said changes are achieved by selecting variable elements by the use of pushbutton switches.

It is an object of the present invention to provide an electric power-controlling apparatus wherein time-limit means for releasing power application and applied power controlling means are actuated through pushbutton operation, thereby facilitating the control and repetitive operation and realizing perfect reproducibility.

Another object of the present invention is to provide an electric power-controlling apparatus wherein a DC power source, timer circuit and gate circuit for a thyristor are separated from an AC power source by energizing a relay with the output of the timer circuit so that the power supply to a load can be safely effected with the aid of the relay having a low capacity, whether the load is high or low.

Another object of the present invention is to provide an electric power-controlling apparatus wherein the output terminals of a gate circuit rendering a thyristor conductive are short-circuited with the output of a timer circuit, and the short-circuiting can be effected by the use of switching elements or switching circuits of a low capacity because of the fact that the gate pulse is constituted by a low voltage and current.

Another object of the present invention is to provide an electric power-controlling apparatus wherein a bridge circuit is constituted by a time-constant series circuit of a resistor and capacitor and a series circuit of two resistors. The connection point between the resistor and the capacitor is connected to the base of a transistor and the connection point between the two resistors is connected to the emitter of the transistor, the capacitor or resistor of said time-constant circuit being changed by selecting elements having different values by means of pushbutton switches. The time limit is made to be proportional to the value of the resistor or capacitor of the time-constant series circuit, thereby facilitating the time setting and minimizing variations of the set time due to variations of the power source voltage.

A further object of the present invention is to provide an electric power-controlling apparatus wherein the resistor of a time-constant series circuit incorporated in the aforementioned timer circuit is constituted by a plurality of resistors connected in series with each other, normally closed switches are connected in parallel with said plurality of resistors, and said switches are opened in suitable combinations to achieve a number of combinations of resistors, thereby adding the set time limits so as to provide a great number of control time limits by using a small number of buttons.

A further object of the present invention is to provide an electric power-controlling apparatus wherein a transistor which is rendered conductive by a signal available from a time-constant circuit incorporated in a timer circuit to charge a capacitor and a transistor which is rendered conductive by the discharge of the capacitor are connected in parallel with each other, whereby a thyristor is short circuited between the gate circuit thereof and a first electrode thereof, and the short circuit is miniaturized, simplified in assembly and of a high durability.

A still further object of the present invention is to provide an electric power-controlling apparatus wherein there is provided an integrating circuit constituted by a resistor and capacitor, a trigger element operating a thyristor is operated by a voltage appearing at the connection point between the resistor and the capacitor, said resistor is constituted by a plurality of series circuits of normally open switches and resistors having different values which are connected in parallel with each other, and the amount of power supplied through the thyristor is easily and accurately controlled by actuating pushbutton switches.

Other objects, features and advantages of the present invention will become apparent from the following description taken in conjunction with the accompanying drawings, in which.

Figure 4:
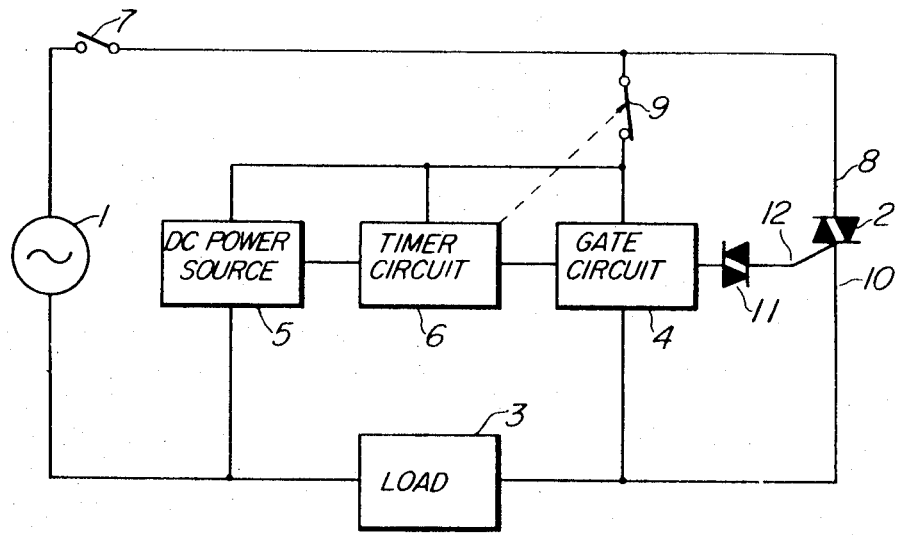
FIGS. 4 and 5 are block diagrams showing examples of the arrangement shown in FIG. 3, respectively.
Figure 5:
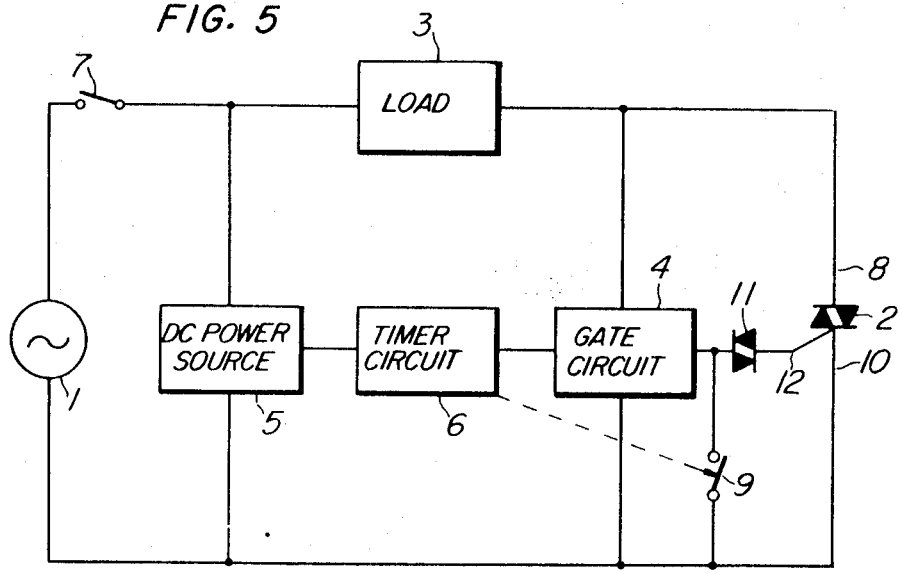
Figure 10:
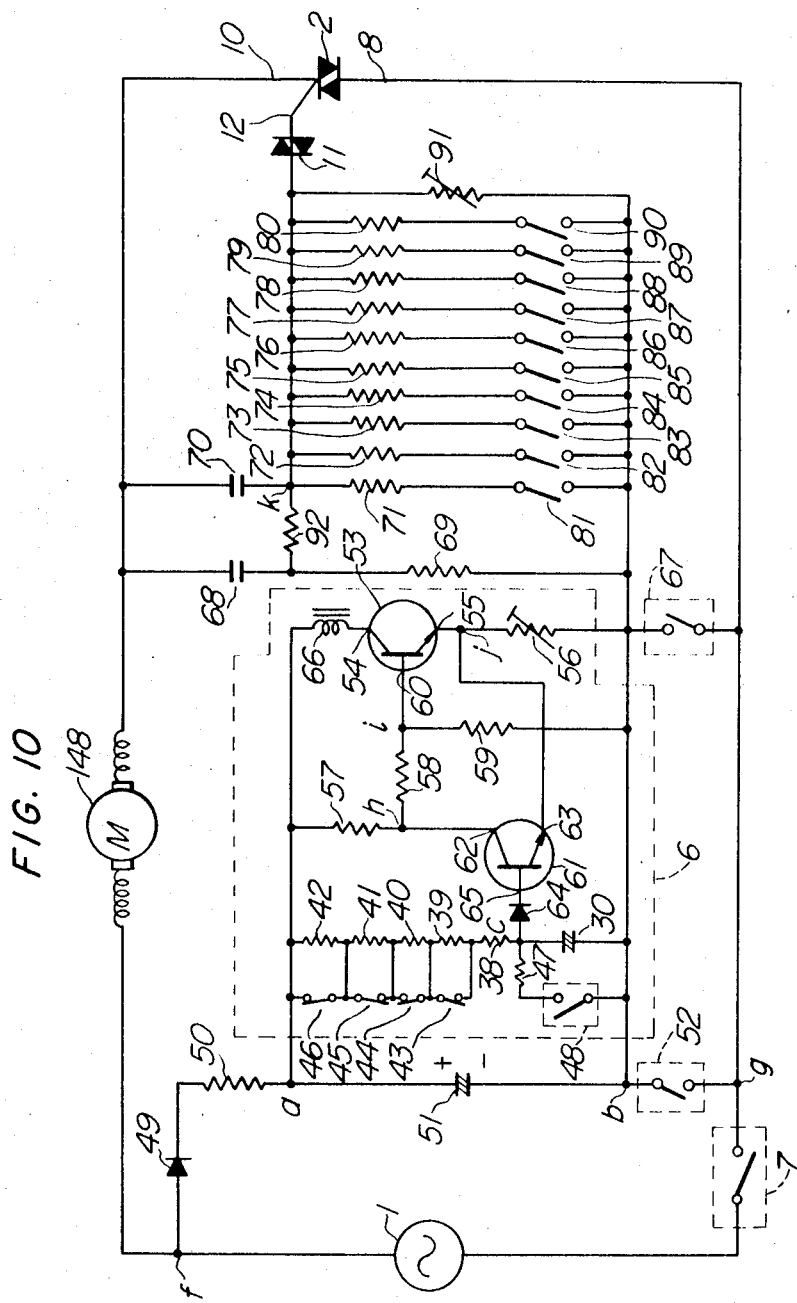
Figure 11:
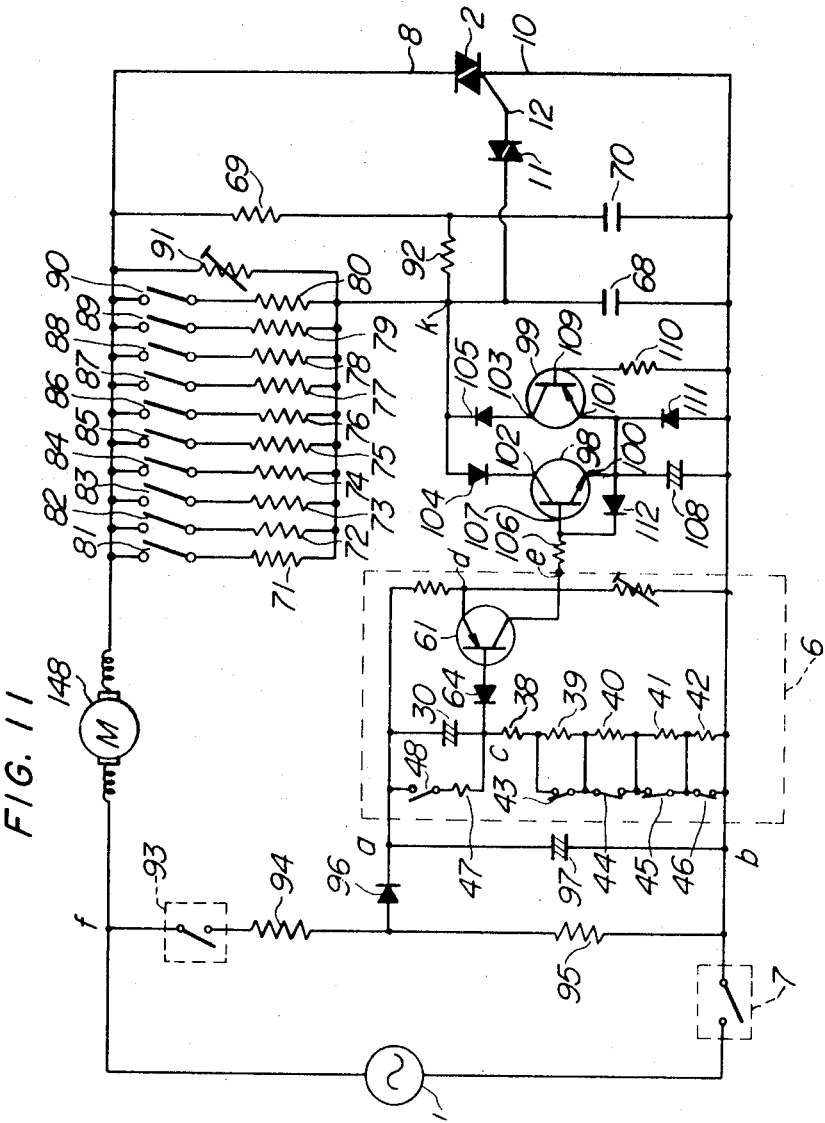

FIG. 6 is a view showing the arrangement operating pushbutton groups provided in FIGS. 4 and 5 and FIGS. 10 and 11 showing examples of the circuit arrangements of FIGS. 4 and 5;

FIG. 7 is a circuit diagram showing the principle of the timer circuit incorporated in the arrangements of FIGS. 4 and 5;

FIGS. 8 and 9 are circuit diagrams showing circuit arrangements constructed in accordance with the principle of the timer circuit shown in FIG. 7, respectively; and FIGS. 10 and 11 are circuit diagrams showing the electric power control apparatus embodying the present invention, respectively.

Figure 1:
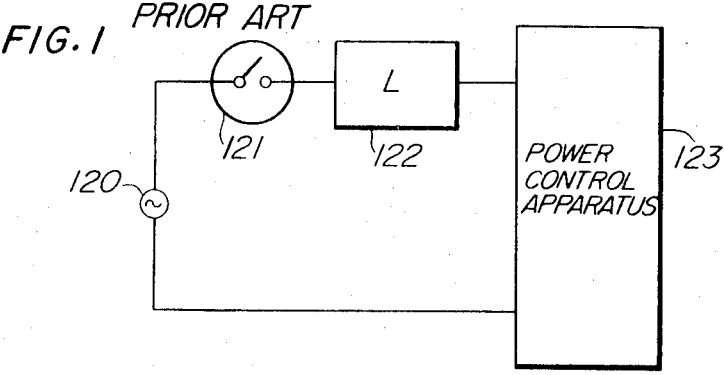
FIG. 1 is a diagram showing the circuit arrangement of a conventional electric power control apparatus.
Figure 2:
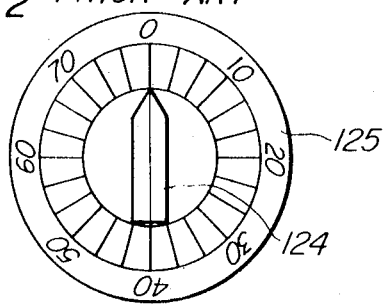
FIG. 2 is a view showing the operating pointer of said conventional electric power control apparatus.
Figure 3:
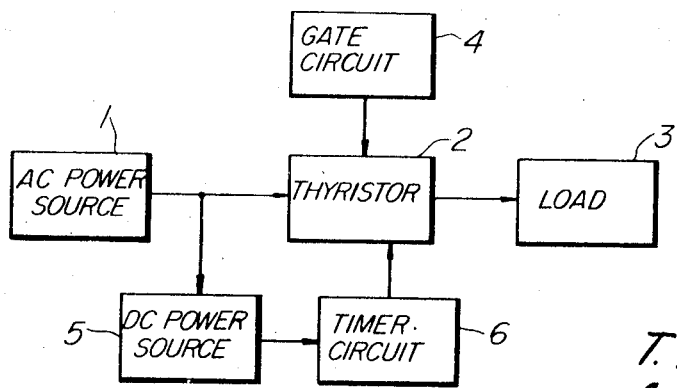
FIG. 3 is a block diagram showing the electric power control apparatus according to an embodiment of the present invention.

Referring first to FIG. 3, numeral 1 represents an AC power source, 2 a thyristor, 3 a load to which AC power is supplied in accordance with the conduction and nonconduction of the thyristor 2, and 4 a gate circuit adapted to control the amount of power supplied to the load 3 by changing the trigger phase of the thyristor 2. Numeral 5 denotes a DC power source, and 6 a timer circuit comprising a charge-discharge circuit for the DC power source 5. The conducting time of the thyristor or the time during which power is supplied to the load is controlled by changing the charging or discharging time of a condenser by selecting the time constant of the timer circuit.

In the foregoing circuit arrangement, the timer circuit 6 operates to change the charging or discharging time of a condenser by the selected time constant to control the conducting time of the thyristor, thus controlling the time for which power is supplied to the load 3. The gate circuit 4 operates to change the trigger phase of the thyristor 4 to thereby control the amount of power supplied to the load 3. The changing of the power supplying time and amount is effected by means of variable elements selected by the push-switches.

FIG. 4 is a block diagram showing an example of FIG. 3, wherein the AC power source 1 constitutes a closed circuit together with a main switch 7, three-terminal bidirectional thyristor 2 (referred to as thyristor hereinafter) and load 3. Gate circuit 4 for the thyristor 2 is connected between the second terminal 8 and the first terminal 10 of the thyristor 2 through a switch means 9 which is operated by the timer circuit 6. Numeral 11 indicates a bidirectional trigger element (referred to as trigger element hereinafter), which is connected between the gate circuit 4 and the gate terminal 12 of the thyristor 2.

In the foregoing circuit arrangement, upon closure of the main switch 7, a pulse determined by means of the gate circuit 4 and trigger element 11 is applied to operate the thyristor 2 with a phase determined by the gate circuit 4, so that a predetermined amount of power is supplied to the load 3. After the lapse of the preset time, the timer circuit 6 is operated to open the switch means 9 so that the trigger element 11 is stopped from providing the pulse. Thus the thyristor 2 interrupts the power supply to the load 3.

FIG. 5 shows a circuit similar to that of FIG. 4, wherein parts corresponding to those of FIG. 4 are indicated by like numerals, except that the switching means 9 operated by the timer circuit 6 is adapted to be closed at the preset time of the timer circuit 6 to short circuit the output terminal of the gate circuit 4 so that the pulse generation by the trigger element 11 is interrupted so as to stop the power supply to the load 3 through the thyristor 2.

FIG. 6 shows an example of the arrangement of pushbutton groups for operating the gate circuit 4 and timer circuit 6 provided in FIGS. 3, 4 and 5, the upper group being related to time setting and the lower group to the control of power amount.

Numeral 13 represents an "OFF" button for turning off the main switch and which is also adapted to returning pushbuttons 16 and 19 which are depressed, to their original positions. Numeral 14 indicates a "continue" button which is adapted to permit of continued operation of the load when depressed. The pushbuttons 16, 17, 18 and 19 are used to select the time-constant elements for determining time limit in the timer circuit 6. The numerals 10, 20, 40 and 80 indicated on these pushbuttons show the respective time limits in second. By depressing the pushbuttons 16 and 18, for example, it is possible not only to provide a time limit of 50 seconds (10+40=50 seconds) but also to separately provide time limits corresponding to the respective pushbuttons. This depends upon the arrangement of the timer circuit and the construction of the pushbuttons.

In order to use the timer circuit 6, the pushbuttons 16 to 19 are depressed to set the time, and the timer circuit 6 is operated by depressing the pushbutton 15, whereupon the required time limit starts. That is, the pushbutton 15 is a "START" pushbutton. This button is returned to the original position when released, whereas the main switch 7 remains closed. Furthermore, the pushbutton 15 is adapted to discharge the charges stored at the capacitor of the timer circuit or close and then immediately open the circuit for charging the capacitor, prior to initiation of charging or discharging.

The lower group of pushbuttons 20 to 29 are provided to control the amount of power supplied to the load. Any one of these pushbuttons is locked when depressed, so that a resistance of the required value in the gate circuit 4 is selected for controlling the trigger phase of the thyristor 2.

As will be appreciated from the foregoing, a required amount of power is supplied to the load for a desired period of time, by operating the pushbuttons. Thus, the control can be greatly facilitated, and repetition can be easily performed, with a perfect reproducibility.

FIG. 7 illustrates the principle of the timer circuit 6 shown in FIGS. 4 and 5, wherein a series circuit of a capacitor 30 and resistor 31 and that of resistors 32 and 33 are connected in parallel with each other between two points $a$ and $b$, the connection points of these series circuits are indicated by $c$ and $d$ respectively and there is provided a PNP-type transistor 36 having the base 34 and emitter 35 thereof connected with the points $c$ and $d$, the collector being indicated by $e$.

In the foregoing circuit arrangement, if a DC voltage is applied between the points $a$ and $b$ with the point $a$ positive and the point $b$ negative, then the potential at the capacitor 30 is zero at the initial stage since there is no charge thereat. It is assumed that the voltage at the point $d$ is $V_d$ volts. It is also assumed that a voltage drop of $V_{be}$ volts occurs between the base 34 and the emitter 35 of the transistor 36, and that the voltage $V_c$ at the point $c$ after $t$ seconds will be represented by $$V_c = V_d + V_{be} \quad (1)$$

Then, a signal appears between the points $b$ and $e$, whereby the gate circuit 4 for the thyristor 2 can be operated. On the assumption that the values of the resistors 31, 32 and 33 and capacitor 30 are $R_3$, $R_2$, $R_1$ and $C$ respectively, the following equation can be obtained from equation (1):

$$t = -R_3 C \log_e \left( -\frac{V_{be}}{E} + \frac{R_1}{R_1 + R_2} \right) \quad (2)$$

As will be seen from this equation, the time $t$ is proportional to the value $R_3$ of the resistor 31 or capacitance $C$ of the condenser 30. Therefore, the time $t$ can be changed by changing either the value of $R_3$ or $C$.

FIG. 8 is an example of the former case, wherein a series circuit of resistors 38, 39, 40, 41 and 42 is inserted in place of the resistor 31 shown in FIG. 7, normally closed switches 43, 44, 45 and 46 are connected in parallel with these resistors respectively, and no such switch is connected with the resistor 38. These switches are adapted to be actuated by pushbuttons 16, 17, 18 and 19 shown in FIG. 4 respectively so that they are opened by depressing these buttons. One end of a resistor 47 is connected with the point $c$ corresponding to the base 34 of the transistor 36, and a normally open switch 48 is connected between the other end of the resistor 47 and the terminal $a$.

Assume now that a DC voltage $E$ is applied between the terminals $a$ and $b$ and that normally closed switch 43 is opened. Then, charging of the capacitor 30 is started, and the operating time of the transistor 36 is given by $$t = -(R_{38} + R_{39}) C \log_e \left( -\frac{V_{be}}{E} + \frac{R_1}{R_1 + R_2} \right) \quad (3)$$

where $R_{38}$ and $R_{39}$ represent the values of resistors 38 and 39 respectively. By providing small values for $R_{38}$ and $R_{39}$, the following expression can be obtained:

$$t \doteqdot -R_{39} \log_e \left( -\frac{V_{be}}{E} + \frac{R_1}{R_1 + R_2} \right) \quad (4)$$

By opening the switches 43 and 45 at the same time, the following expression can be obtained:

$$t \doteqdot -(R_{39} + R_{41}) C \log_e \left( \frac{V_{be}}{E} + \frac{R_1}{R_1 + R_2} \right) \quad (5)$$

That is, by opening the normally closed switches 43, 44, 45 and 46 in combination, the time $t$ can be increased in correspondence to the combination. In this case, the number of the normally closed switches is four, and the total number of combinations is 15. Thus, it is possible to set up 15 different time limits. Assume that the time limits obtained by opening the respective switches are 10 seconds, 20 seconds, 40 seconds and 80 seconds as indicated on the pushbuttons 16 to 19 in FIG. 4 respectively. Then, 15 different time limits can be set up between 10 seconds and 150 seconds with an interval of 10 seconds therebetween.

Thus, it is possible to set up a great number of time limit combinations by selectively opening a plurality of such parallel circuits of normally closed switches and resistors which are connected in series with each other.

If it is now assumed that the number of such parallel circuits is $n$, then it is possible to obtain ($2^n-1$) set time limits.

The resistor 38 serves to limit a current flowing between the emitter 35 and the base 34 of the transistor 36 since there is a possibility that the transistor 36 is damaged by the fact that the current tends to be excessively increased when the DC power source is supplied to the transistor. In order to set up a new time limit after the lapse of a certain time limit, namely, in order to perform repetitive time limit setting operation, it is essential to reduce the charges at the condenser 30 down to zero. For this purpose, there is provided a switch 48 which is closed at a predetermined point of time so that the charges at the condenser 30 are discharged therethrough, and a resistor 47 is provided for preventing the discharge current from becoming excessive.

FIG. 9 shows a modified form of timer circuit 6 wherein resistors and switches are connected in a different manner. In this example, normally open switches 43', 44', 45' and 46' provided in place of the normally closed switches of FIG. 8 are selectively connected with the resistors 39, 40, 41 and 42 respectively. Series circuits of the resistors 39, 40, 41 and 42 and switches 43', 44', 45' and 46' are connected in parallel with each other between the points $c$ and $b$. The pushbutton structure is designed so that by depressing the button, one of the switches is closed and the remaining switches are opened so that only one switch is connected between the points $c$ and $b$. With such an arrangement, the number of available time limits corresponds to the number of the series circuits of the resistors and switches. This is sufficiently effective with respect to certain applications, although it is less than the number of the combinations available in the case of FIG. 8.

As described above, changing of the time constant can be effected by changing the capacitance of the condenser 30. In order to change the time constant by use of the pushbutton, this can be achieved by using condensers having different values and normally closed or open switches. It will be readily apparent that a similar circuit arrangement can be constructed by using an NPN-transistor instead of the PNP-transistor 36.

FIGS. 10 and 11 show examples of the circuit embodying the present invention, respectively. FIG. 10 shows an example of FIG. 4, and FIG. 11 shows an example of FIG. 5.

Referring to FIG. 10, a closed circuit is constituted by an AC power source 1, armature motor 148 (referred to as a motor hereinafter) serving as load 3, thyristor 2 and main switch 7, and it is the main circuit for the motor 148. The phase and rotational frequency of the motor can be changed by means of the thyristor 2. Detailed description will now be made of the time limit setting circuit and trigger circuit for determining the phase of the thyristor 2.

Timer circuit 6 is connected across the connection point $f$ between the AC power source 1 and the motor 148 and the connection point $g$ between the main switch 7 and the second terminal 8 of the thyristor 2.

DC power source 5 for the timer circuit includes a diode 49 having the anode thereof connected with the point $f$ and the cathode connected with the point $g$ through a series circuit of a resistor 50, chemical condenser 51 and normally open switch 52. At this point, a DC voltage appears across the chemical condenser 51, with the positive side thereof at the point $a$ and the negative side thereof at the point $b$.

Connected across the points $a$ and $b$ is a series circuit of a relay coil 66, collector 54 of an NPN-transistor 53, emitter 55 thereof, semifixed resistor 56 and resistors 57, 58 and 59. These elements are arranged in this order as viewed from the point $a$, $h$ and $i$ indicating the connection point between the resistors 57 and 58 and between the resistors 59 and 58, respectively. The base 60 of the transistor 53 is connected with the connection point $i$. A point $j$ corresponds to the emitter 55 of the transistor 53. By suitably selecting the resistance values of the semifixed resistor 56, resistors 57, 58 and 59 and relay coil 66, a certain voltage is applied between the base 60 and the emitter 55 of the transistor 53, so that the transistor 53 is rendered completely nonconductive between the collector 54 and the emitter 55. In this example, the timer circuit 6 is constructed by the connection enclosed by a dotted line and relay coil 66 and semifixed resistor 56 in such a fashion as to correspond to FIG. 8 tuned over longitudinally through 180°. The collector 62 of an NPN-transistor 61 is connected to the point $h$, and the emitter 63 thereof is connected with the point $j$. The respective resistors 38, 39, 40, 41, 42 and 47, switches 43, 44, 45, 46 and 48 and chemical condenser 30 of FIG. 8 are connected in a manner completely reverse to that of FIG. 8. Diode 64 is connected between the point $c$ corresponding to the positive side of the chemical condenser 30 and the base 65 of the transistor 61 with the anode thereof positioned at the base side of the transistor 61.

In operation, by closing the main switch 7 and normally open switch 52, a DC voltage is generated across the points $a$ and $b$ so that the transistor 53 is rendered conductive as described above. As a result, a current is caused to flow through the relay coil 66 to close a contact 67. In this case, the relay coil 66 is self-held even if the normally open switch 52 is opened. However, it is assumed that the switches 43, 44, 45 and 46 are opened in any combination. For example, if only the switches 46 and 44 or the switch 45 is opened, then the sum of the values of the resistors 42 and 40 or the value of the resistor 41 is inserted between the points $a$ and $c$, so that the potential at the base 65 of the transistor 61 builds up in accordance with the charging characteristic of the chemical condenser 30 depending upon the aforementioned resistance value upon application of a voltage between the points $a$ and $b$. When the base potential of the transistor 61 exceeds the sum of the potential at the emitter thereof and the base-emitter voltage, a current is caused to flow from the collector 62 of the transistor 61 to the emitter 63 thereof at the time represented by equation (2). Thus, the potential at the point $h$ is decreased while that at the point $i$ is increased, so that the voltage between the base 60 and the emitter 55 of the transistor 53 is rapidly decreased so that the latter is rendered nonconductive. Consequently, the relay 66 opens the contact 67. Thus, the DC power source circuit is stopped from providing DC voltage, and the circuit arrangement is returned to the original state. The operating time of the relay 66 corresponds theoretically to the time $t$ determined from the foregoing equations 2, 3, 4 and 5. The semifixed resistor 56 is provided for the purpose of adjustment to make the time $t$ constant irrespective of any irregularity in the values of all the components. The diode 64 serves to prevent any reverse voltage from being applied between the base 65 and the emitter 63 of the transistor 61. Description will now be made of the power-controlling portion, wherein connected between the terminal 10 of the thyristor 2 and the point $b$ are a series circuit of a condenser 68 and resistor 69 and a series circuit of a condenser 70 and series circuits of resistors 71 and 80 and normally open switches 81 to 90 connected in parallel with each other, as in FIG. 5. A semifixed resistor 91 is connected between the connection point $k$ between the condenser 70 and the resistors 71 and 80 and the point $b$, and a trigger element 11 is connected between the point $k$ and the gate terminal 12 of the thyristor 2. Numeral 92 indicates a resistor inserted between the connection point between the condenser 68 and the resistor 69 and that between the condenser 70 and the resistor 71.

In operation, by closing the normally open switch 85 for example while the contact 67 is closed by the relay 66, the value of the resistor 75 is inserted between the points $b$ and $k$, so that an integrating circuit is constituted by the resistor 75 and condenser 70. Thus, the trigger element 11 is operated to permit the thyristor 2 to determine the amount of power to be supplied to the motor 148. The provision of the condenser 68 and resistors 69 and 92 makes it possible to achieve a small conduction angle which cannot be achieved merely by the use of the aforementioned integrating circuit. This means that supply of a low power is possible. When the contact 67 of the relay 66 is opened by the timer circuit 6, the trigger element 11 is disabled to provide a signal so that the power supply to the motor 148 through the thyristor 2 is interrupted.

The relationship between the foregoing power controlling portion and the pushbutton groups shown in FIG. 6 is as follows: By depressing the "CONTINUE" pushbutton 14, the switches 48 and 52 are closed so that the chemical condenser 30 is kept short circuited. Hence, there occurs no voltage buildup, and therefore the contact 67 is not opened eventually by the relay 66. The normally open switch 52 is so designed as to be returned to the original position when the hand is removed therefrom. The normally open switch 52 is associated with the "START" button 15, the main switch 7 with "OFF" button 13, and the normally closed switches 43, 44, 45 and 46 with the pushbuttons 16, 17, 18 and 19 respectively.

The pushbuttons 20 to 29 of FIG. 6 are associated with the normally open switches 81 to 90 respectively. The semifixed resistor 91 serves to make constant the amount of power supplied to the motor 148. It is possible to set the conduction angle of the thyristor 2 to a desired value by closing the normally open switch 81 and suitably turning the semifixed resistor 91.

As described above, the setting operation is simplified because of the pushbutton system, and a perfect reproducibility can be achieved by the fact that the amount and time of the power supply to the load are preset. Furthermore, accurate setting can be achieved, even in the case of repetitive use.

Even if the power supply is stopped and started again, the supply of power to the load is automatically interrupted because of the fact that the self-holding circuit of the relay 66 utilized. Thus, safety can be insured. Further, the current flowing through the contact of the relay 66 is the one which also flows through the gate circuit, DC power source circuit and timer circuit, and therefore it is low enough to be able to use a relay having a low-contact capacity.

FIG. 11 shows an example of FIG. 5, wherein a closed circuit is constituted by the AC power source 1, motor 148, thyristor 2 and main switch 7, and normally open switch 93 and resistors 94 and 95 are connected between the connection point $f$ between the AC power source 1 and the motor 148 and the connection point $b$ between the main switch 7 and the first terminal 10 of the thyristor 2. A diode 96 is connected between the connection point between the resistors 94 and 95 and a point $a$, and a chemical condenser 97 is connected between points $a$ and $b$. Thus, application of an AC voltage between the points $f$ and $b$ results in a DC voltage appearing between the points $a$ and $b$. The points $a$ and $b$ of the timer circuit 6 shown in FIG. 6 are connected with the aforementioned points $a$ and $b$ respectively. When a preset point of time is reached, therefore, a signal appears between the points $e$ and $b$ of the timer circuit 6. The purpose of this circuit is to interrupt the gate signal for the thyristor 2 by the use of the aforementioned signal.

An NPN-transistor 98 and PNP-transistor 99 are connected in parallel with each other. The emitters 100 and 101 are short circuited with one another, and the collectors 102 and 103 lead to a point $k$ through diodes 104 and 105 respectively, with the cathode of the diode 104 coupled to the collector 102 and the anode of the diode 105 to the collector 103. The point $e$ is connected with the base 107 of the transistor 98 through a resistor 106 for limiting the amplitude of an input signal to a suitable level. The emitter 100 of the transistor 98, base 109 of the transistor 99 and emitter of the latter are connected with the point $b$ through a chemical condenser 108, resistor 110 and diode 111 having the cathode thereof coupled to the emitter 101, respectively.

A diode 112 is connected between the base 107 and the emitter 100 of the transistor 98 with the cathode of the diode coupled to the base. The trigger circuit between the second terminal 8 of the thyristor 2—point $g$—first terminal 10—point $b$ is connected in the same manner as in the case of FIG. 8. That is, one end of the condensers 68 and 70 is connected with the point $b$, and these condensers are connected with each other at the other end through resistor 92. The condenser 70 is connected with the point $g$ through the resistor 69, and series circuits of conduction setting resistors 71 to 80 and normally open switches 81 to 90 connected in parallel with each other are inserted between the point $k$ of the condenser 68 and the point $g$. The trigger element 11 is between the point $k$ and the gate terminal 12 of the thyristor 2. Connected between the points $k$ and $g$ is semifixed resistor 91 for controlling the lowest rotational frequency.

Description will now be made of the operation of this circuit arrangement. When a signal available from the timer circuit 6 is supplied between the points $e$ and $b$, a current is caused to flow through a circuit constituted by resistor 106—base 107 of the transistor 98—emitter 100 thereof—chemical condenser 108, so that the chemical condenser 108 begins to be charged with the emitter current amplified in the transistor 98. At this point, if the AC voltage becomes positive at the point $k$, then a current is caused to flow through the point $k$—diode 104—collector 102 of the transistor 98—emitter 100 thereof—chemical condenser 108—point $b$ in the named order because of the fact that no resistance is present between the points $k$ and $b$, so that the voltage between the points $k$ and $b$ is rapidly decreased.

When the AC voltage becomes positive at the point $b$, a current is caused to flow through a closed circuit consisting of the chemical condenser 108—emitter 101 of the transistor 99—base 109 thereof—resistor 110—point $b$ because of the presence of charges at the chemical condenser 108. As a result, an amplified current is caused to flow through the point $b$—diode 111—emitter 101 of the transistor 99—collector 103 thereof—diode 105—point $k$ in the named order, so that the voltage between the points $b$ and $k$ is rapidly decreased. Thus, a signal enters between the points $e$ and $b$, whereby the points $k$ and $b$ are short circuited AC-wise. As will be seen from the above, the two transistors 98 and 99 serve as AC switching means corresponding to the switch 9 shown in FIG. 5, thus interrupting the power supply. The diode 112 is provided for the purpose of protecting the transistor 98 by preventing a high-reverse voltage from being applied between the base 107 and the emitter 100 of the transistor 98 when the voltage appearing between the points $k$ and $b$ becomes positive at the point $b$ side.

As described above, the thyristor 2 is enabled to stop the motor 148 after the lapse of a predetermined period of time by opening the normally closed switches 43, 44, 45 and 46 in a predetermined combination. In this way, the adjustment of the amount of power and setting of power supplying time can be achieved by actuating the pushbuttons even in the case where the relay is not employed. Especially in the circuit shown in FIG. 9, all the elements other than the switches are completely contactless, and therefore the control device is of high durability.

As will be appreciated from the foregoing, in accordance with the present invention, power supplied to a load is controlled by means of a thyristor, and the control of the power supplying time is achieved by detecting by means of transistors that a charge or discharge voltage at a condenser has become equal to a reference voltage to thereby render operative shorting circuit consisting of elements such as transistor and relay or transistor and diode so as to control the gate circuit of the thyristor. It is particularly to be noted that all the operation for determining a time limit is performed by way of a pushbutton system.

The present invention has the following characteristics:
1. Because of the pushbutton system, the operation is simplified and free from errors.
2. For the same time limit, the setting of it can be easily and quickly effected merely by depressing the "START" button.

3. The same time limit and rotational frequency can always be obtained. It is possible to void errors in adjustment and mechanical errors due to aging which tend to be involved in the prior art arrangement wherein a pointer is turned to effect the desired control.
4. Because of the fact that the time-limit-setting up means is of the summing system, a great number of combinations can be realized by means of a small number of buttons.
5. Safety can be insured because in the case where use is made of a relay, even if the power source is cut off and then turned on while the apparatus is set to the operating condition, the motor is not rotated.
6. A high durability can be achieved because of the fact that the elements constituting the present apparatus except for the switches are contactless ones such as transistors, resistors and condensers.
7. The time-limit setting can be simply and quickly effected by adjusting the voltage by rotating the semifixed resistor.
8. The time controlling operation can be silently performed without any noise which tends to occur in a spring type one, because the timer circuit is constructed by the use of electronic components.
9. Because of the fact that the timer circuit is constructed by the use of electronic components, zero resetting can be achieved simply by discharging charges stored at the condenser, thus resulting in simplified construction and operation.

What is claimed is:

1. An electric power-controlling apparatus comprising
   a. a thyristor connected in series with an AC power source and a load;
   b. a timer circuit comprising first resistor means and first capacitor means;
   c. rectifier means connected between said timer circuit and said AC power source, said rectifier means charging said first capacitor means through said first resistor means, said timer circuit producing an output when said capacitor is charged or discharged to a predetermined potential;
   d. a gate circuit comprising series-connected second resistor means and second capacitor means, said gate circuit generating a gate signal having a relative phase determined by the values of said second resistor and said second capacitor means;
   e. a first transistor coupled to the output of said timer circuit and rendered conductive thereby;
   f. third capacitor means coupled to said first transistor for charging therethrough;
   g. a second transistor having a polarity opposite that of said first transistor and connected in parallel therewith, said second transistor being rendered conductive by discharging said third capacitor means thereby short-circuiting the output of said gate circuit; and
   h. pushbutton switching means for selectively changing the resistance values of said first and second resistor means, said thyristor being rendered conductive with a firing angle dependent on the relative phase of said gate signal and being rendered nonconductive when the output of said gate circuit is short circuited.

2. An electric power-controlling apparatus according to claim 1, wherein said timer circuit comprises a bridge circuit including said first resistor means, said first capacitor, and a series circuit including two resistors and a transistor, a base of which is connected with the junction of said first resistor means and said first capacitor and an emitter of which is connected with the junction of said two resistors, and said first resistor means includes a plurality of resistors forming a resistance circuit which are selectively and independently disconnectable from said resistance circuit by said pushbutton circuit.

3. An electric power-controlling apparatus according to claim 2, wherein said first resistor means comprises a series circuit of said plurality of resistors and said pushbutton circuit comprises a plurality of pushbutton type normally closed switches which are respectively connected in parallel with said resistors.

4. An electric power-controlling apparatus according to claim 1 wherein said gate circuit comprises a trigger element for producing said gate signal responsive to the voltage at the junction of said second resistor means and said second capacitor, and said second resistor means comprises a plurality of parallel circuits, each having a series circuit including a resistor and a normally opened switch.

5. An electric power-controlling apparatus comprising
   a. a thyristor connected in series with an AC power source and a load;
   b. a timer circuit comprising first resistor means and first capacitor means;
   c. rectifier means connected between said timer circuit and said AC power source, said rectifier means charging said first capacitor means through said first resistor means, said timer circuit producing an output when said capacitor is charged or discharged to a predetermined potential;
   d. a gate circuit comprising series-connected second resistor means and second capacitor means, said gate circuit generating a gate signal having a relative phase determined by the values of said second resistor and said second capacitor means;
   e. a relay having a coil coupled to said timer circuit and at least one contact connected between said AC power source and said rectifier means, timer circuit and gate circuit, said relay contact being closed by the operation of said timer circuit thereby energizing said timer for continued operation thereof after starting, said contact opening to deenergize said timer circuit after said timer circuit deenergizes said relay coil; and
   f. pushbutton switching means for selectively changing the resistance values of said first and second resistor means and for starting said timer circuit by connecting it to said AC power source, said thyristor being rendered conductive with a firing angle dependent on the relative phase of said gate signal and being rendered nonconductive by the output of said timer circuit.

6. An electric power-controlling apparatus according to claim 5, wherein said gate circuit comprises a trigger element for producing said gate signal responsive to the voltage at the junction of said second resistor means and said second capacitor, and said second resistor means comprises a plurality of parallel circuits, each having a series circuit including a resistor and a normally opened switch.

* * * * *

UNITED STATES PATENT OFFICE
CERTIFICATE OF CORRECTION

Patent No. 3,638,091  Dated January 25, 1972

Inventor(s) Tomoyuki HOSOKAWA et al

It is certified that error appears in the above-identified patent and that said Letters Patent are hereby corrected as shown below:

In the Claim for Convention Priority, five of the six Japanese applications are omitted and should be included as follows:

--Japan, Appln. N° 43/85606 filed Nov. 25, 1968;
  Japan, Appln. N° 43/85607 filed Nov. 25, 1968;
  Japan, Appln. N° 43/85608 filed Nov. 25, 1968;
  Japan, Appln. N° 43/85609 filed Nov. 25, 1968; and
  Japan, Appln. N° 43/94343 filed Dec. 19, 1968. --.

Signed and sealed this 15th day of August 1972.

(SEAL)
Attest:

EDWARD M. FLETCHER, JR.          ROBERT GOTTSCHALK
Attesting Officer                Commissioner of Patents